United States Patent [19]

Fulks et al.

[11] Patent Number: 4,532,311

[45] Date of Patent: Jul. 30, 1985

[54] PROCESS FOR REDUCING SHEETING DURING POLYMERIZATION OF ALPHA-OLEFINS

[75] Inventors: Bernard D. Fulks, Victoria, Tex.; Steven P. Sawin; Collin D. Aikman, both of Charleston; John M. Jenkins, III, South Charleston, all of W. Va.

[73] Assignee: Union Carbide Corporation, Danbury, Conn.

[21] Appl. No.: 650,571

[22] Filed: Sep. 14, 1984

Related U.S. Application Data

[63] Continuation of Ser. No. 244,990, Mar. 26, 1981, abandoned.

[51] Int. Cl.³ .................................................. C08F 2/34
[52] U.S. Cl. ........................................ 526/62; 526/74; 526/113; 526/901
[58] Field of Search .......................................... 526/62

[56] References Cited

U.S. PATENT DOCUMENTS

| | | | |
|---|---|---|---|
| 3,879,362 | 4/1975 | Chalfont | 260/88.2 |
| 3,922,322 | 11/1975 | Roger | 526/62 |
| 3,976,632 | 8/1976 | Delap | 526/113 |
| 3,995,097 | 11/1976 | Brown | 526/74 |
| 4,035,560 | 7/1977 | Caumartin | 526/905 |
| 4,059,720 | 11/1977 | Kolling | 526/74 |
| 4,068,054 | 1/1978 | Willcox | 526/74 |
| 4,152,502 | 5/1979 | Levine | 526/113 |
| 4,255,470 | 3/1981 | Cohen | 526/62 |

FOREIGN PATENT DOCUMENTS 0005215 4/1979 European Pat. Off. .
0008799 5/1979 European Pat. Off. .

OTHER PUBLICATIONS

Pohl, "Nonuniform Field Effects: Dielectrophoresis", *Electrostatics and Its Applications*, pp. 336–338.

Masuda, Komatsu, Mitsui and Iinoya, "Electrification of Gas Solid Suspensions Flowing in Steel and Insulating-Cooled Pipes", Journal of Electrostatics, 2(1976/77), pp. 341–350.

Geldart and Boland, "Electrostatic Charging in Gas Fluidized Beds", *Power Technology*, 5 (1971–1972).

"Reduction of Particle Agglomeration in a Fluidizing Gas Stream in the Presence of a Radiofrequency Glow Discharge", *I & EC Fund.*, 1980, 19, 315–316.

Geldart, Boland and Al-Salim, "Static Electrification in Fluidized Beds", *Chem. Eng. Sci.*, 1969, vol. 24, pp. 1389–1390.

*Primary Examiner*—Paul R. Michl
*Attorney, Agent, or Firm*—Clement J. Vicari

[57] ABSTRACT

A process for reducing sheeting during production of polyolefins by polymerization of alpha-olefins utilizing titanium based polymerization catalysts wherein the static electric charges in the reactor at the site of possible sheet formation are maintained below static voltage levels which would otherwise cause sheet formation.

15 Claims, 1 Drawing Figure

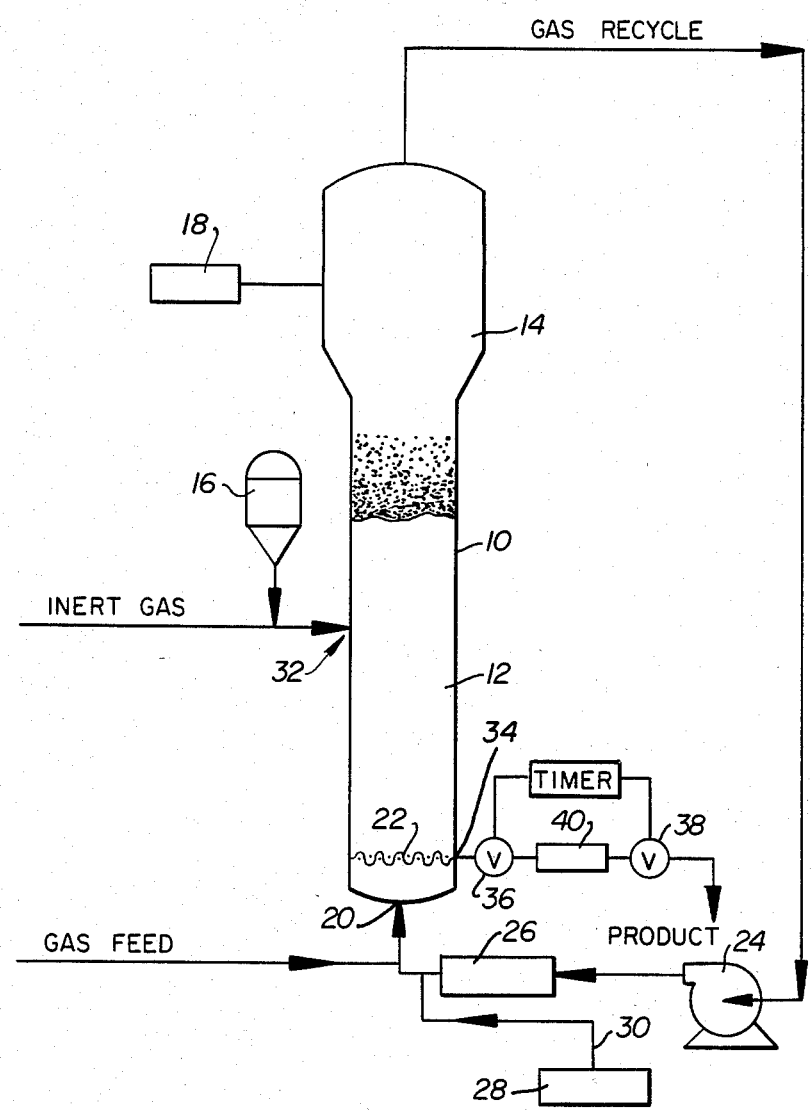

PROCESS FOR REDUCING SHEETING DURING POLYMERIZATION OF ALPHA-OLEFINS

This application is a continuation of prior U.S. application Ser. No. 247,990, filed Mar. 26, 1981, now abandoned.

Conventional low density polyethylene has been historically polymerized in heavy walled autoclaves or tubular reactors at pressures as high as 50,000 psi and temperatures up to 300° C. or higher. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

More recently, technology has been provided whereby low density polyethylene can be produced by fluidized bed techniques at low pressures and temperatures by copolymerizing ethylene with various alpha olefins. These low pressure LDPE (LP-LDPE) resins generally possess little, if any, long chain branching and are sometimes referred to as linear LDPE resins. They are short chain branched with branch length and frequency controlled by the type and amount of comonomer used during polymerization.

As is well known to those skilled in the art, low pressure, high or low density polyethylenes can now be conventionally provided by a fluidized bed process utilizing several families of catalysts to produce a full range of low density and high density products. The appropriate selection of catalysts to be utilized depends in part upon the type of end product desired, i.e., high density, low density, extrusion grade, film grade resins and other criteria.

The various types of catalysts which may be used to produce polyethylenes in fluid bed reactors can generally be typed as follows:

Type I. The silyl chromate catalysts disclosed in U.S. Pat. No. 3,324,101 to Baker and Carrick and U.S. Pat. No. 3,324,095 to Carrick, Karapinka and Turbet. The silyl chromate catalysts are characterized by the presence therein of a group of the formula:

$$\left[ \begin{array}{c} R \\ | \\ Si-O-Cr-O \\ | \\ R \end{array} \begin{array}{c} O \\ \| \\ \\ \| \\ O \end{array} \right]$$

wherein R is a hydrocarbyl group having from 1 to 14 carbon atoms. The preferred silyl chromate catalysts are the bis(triarylsilyl)chromates and more preferably bis(triphenylsilyl) chromate.

This catalyst is used on a support such as silica, alumina, thoria, zirconia and the like, other supports such as carbon black, micro-crystalline cellulose, the non-sulfonated ion exchange resins and the like may be used.

Type II. Ths bis(cyclopentadienyl) chromium (II) compounds disclosed in U.S. Pat. No. 3,879,368. These bis(cyclopentadienyl) chromium (II) compounds have the following formula:

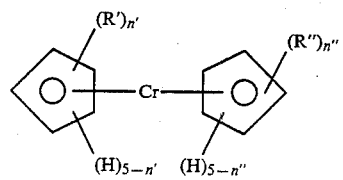

wherein R' and R" may be the same or different $C_1$ to $C_{20}$ inclusive, hydrocarbon radicals, and n' and n'" may be the same or different integers of 0 to 5, inclusive. The R' and R" hydrocarbon radicals may be saturated or unsaturated, and can include aliphatic, alicyclic and aromatic radicals such as methyl, ethyl, propyl, butyl, pentyl, cyclopentyl, cyclohexyl, allyl, phenyl and naphthyl radicals. heretofore described.

These catalysts are used on a support as heretofore described.

Type III. The catalysts as described in U.S. Pat. No. 4,011,382. These catalysts contain chromium and titanium in the form of oxides and, optionally, fluorine and a support. The catalysts contain, based on the combined weight of the support and the chromium, titanium and fluorine, about 0.05 to 3.0, and preferably about 0.2 to 1.0, weight percent of chromium (calculated as Cr), about 1.5 to 9.0, and preferably about 4.0 to 7.0, weight percent of titanium (calculated as Ti), and 0.0 to about 2.5, and preferably about 0.1 to 1.0 weight percent of fluorine (calculated as F).

The chromium compounds which may be used for the Type III catalysts include $CrO_3$, or any compound of chromium which is oxidizable to $CrO_3$ under the activation conditions employed. At least a portion of the chromium in the supported, activated catalyst must be in the hexavalent state. Chromium compounds other than $CrO_3$ which may be used are disclosed in U.S. Pat. No. 2,825,721 and U.S. Pat. No. 3,622,521 and include chromic acetyl acetonate, chromic nitrate, chromic acetate, chromic chloride, chromic sulfate, and ammonium chromate.

The titanium compounds which may be used include all those which are oxidizable to $TiO_2$ under the activation conditions employed, and include those disclosed in U.S. Pat. No. 3,622,521 and Netherlands Patent Application No. 72-10881.

The fluorine compounds which may be used include HF, or any compound of fluorine which will yield HF under the activation conditions employed. Fluorine compounds other than HF which may be used are disclosed in Netherlands Patent Application No. 72-10881.

The inorganic oxide materials which may be used as a support in the catalyst compositions are porous materials having a high surface area, that is, a surface area in the range of about 50 to about 1000 square meters per gram, and an average particle size of about 20 to 200 microns. The inorganic oxides which may be used include silica, alumina, thoria, zirconia and other comparable inorganic oxides, as well as mixtures of such oxides.

Type IV. The catalysts as described in U.S. patent application Ser. No. 892,325, filed on Mar. 31, 1978, in the names of F. J. Karol et al, and entitled, "Preparation of Ethylene Copolymers in Fluid Bed Reactor" and assigned to the same assignee as the present application and which was abandoned in favor of continuation-in-part application Ser. No. 14,414 filed Feb. 27, 1979 now U.S. Pat. No. 4,302,566 issued Nov. 24, 1981. These catalysts comprise at least one titanium compound, at least one magnesium compound, at least one electron donor compound, at least one activator compound and at least one inert carrie material.

The titanium compound has the structure $$Ti(OR)_a X_b$$

wherein R is a $C_1$ to $C_{14}$ aliphatic or aromatic hydrocarbon radical, or COR' where R' is a $C_1$ to $C_{14}$ aliphatic or aromatic hydrocarbon radical; X is Cl, Br, or I; a is 0 or 1; b is 2 to 4 inclusive; and a+b=3 or 4.

The titanium compounds can be used individually or in combination thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $$MgX_2$$

wherein X is Cl, Br, or I. Such magnesium compounds can be used individually or in combinations thereof and would include $MgCl_2$, $MgBr_2$ and $MgI_2$. Anhydrous $MgCl_2$ is the preferred magnesium compound.

The titanium compound and the magnesium compound are generally used in a form which will facilitate their dissolution in the electron donor compound.

The electron donor compound is an organic compound which is liquid at 25° C. and in which the titanium compound and the magnesium compound are partially or completely soluble. The electron donor compounds are known as such or as Lewis bases.

The electron donor compounds would include such compounds as alkyl esters of aliphatic and aromatic carboxylic acids, aliphatic ethers. cyclic ethers and aliphatic ketones.

The catalyst may be modified with a boron halide compound having the structure $$BR_c X'_{3-c}$$

wherein
R is an aliphatic or aromatic hydrocarbon radical containing from 1 to 14 carbon atoms or OR', wherein R' is also an aliphatic or aromatic hydrocarbon radical containing from 1 to 14 carbon atoms,
X' is selected from the group consisting of Cl and Br, or mixtures thereof, and
c is 0 or 1 when R is an aliphatic or aromatic hydrocarbon and 0, 1 or 2 when R is OR'.

The boron halide compounds can be used individually or in combination thereof, and would iclude $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$, and $B(OC_6H_5)_2Cl$. Boron trichloride is the particularly preferred boron compound.

The activator compound has the structure $$Al(R'')_c X'_d H_e$$

wherein X' is Cl or $OR_1$; $R_1$ and R'' are the same or different and are $C_1$ to $C_{14}$ saturated hydrocarbon radicals, d is 0 to 1.5, e is 1 or 0, and c+d+e=3.

Such activator compounds can be used individually or in combinations thereof.

The carrier materials are solid, particulate materials and would include inorganic materials such as oxides of silicon and aluminum and molecular sieves, and organic materials such as olefin polymers, e.g., polyethylene.

In general, the above catalysts are introduced together with the polymerizable materials, into a reactor having an expanded section above a straight-sided section. Cycle gas enters the bottom of the reactor and passes upward through a gas distributor plate into a fluidized bed located in the straight-sided section of the vessel. The gas distributor plate serves to ensure proper gas distribution and to support the resin bed when gas flow is stopped.

Gas leaving the fluidized bed entrains resin particles. Most of these particles are disengaged as the gas passes through the expanded section where its velocity is reduced.

The operating difficulties associated with the utilization of catalyst types I through III in the above described reactors have been substantially eliminated, resulting in the economic and efficient production of low pressure, low or high density polyethylene resins which have a wide variety of uses.

In order to satisfy certain end use applications for ethylene resins, such as for film, injection molding and roto molding applications, catalyst type IV has been used. However, attempts to produce certain ethylene resins utilizing the type IV catalysts supported on a porous silica substrate in certain fluid bed reactors, have not been entirely satisfactory from a practical commerical standpoint. This is primarily due to the formation of "sheets" in the reactor after a brief period of operation. The "sheets" can be characterized as constituting a fused polymeric material.

The sheets vary widely in size, but are similar in most respects. They are usually about ¼ to ½ inch thick and are from about one to five feet long, with a few specimens even longer. They have a width of about 3 inches to more than 18 inches. The sheets have a core composed of fused polymer which is oriented in the long direction of the sheets and their surfaces are covered with granular resin which has fused to the core. The edges of the sheets have a hairy appearance from strands of fused polymer.

After a relatively short period of time during polymerization, sheets begin to appear in the reactor, and these sheets plug product discharge systems forcing shutdown of the reactor.

Accordingly, it will be seen that there presently exists a need to improve the polymerization techniques necessary for the production of polyolefin products utilizing titanium based catalysts in fluidized bed reactors.

It is therefore an object of the present invention to provide a process to substantially reduce or eliminate the amount of sheeting which occurs during the low pressure fluidized bed polymerization of alpha olefins utilizing titanium based compounds as catalyst.

Another object is to provide a process for treating fluidized bed reactors utilized for the production of polyolefin resins utilizing titanium based catalyst or other catalysts which result in similar sheeting phenomena.

These and other objects will become readily apparent from the following description taken in conjunction with the accompanying drawing which generally indicates a typical gas phase fluidized bed polymerization process for producing high density and low density polyolefins.

Broadly contemplated, the present invention provides an improvement in the method for polymerization of alpha olefins in a fluid bed reactor utilizing titanium based catalysts or other catalysts prone to cause sheeting during said polymerization, the improvement comprising maintaining the static electric charge in said reactor at the site of possible sheet formation below static voltage levels which would otherwise cause sheet formation.

The critical static voltage level for sheet formation is a complex function of resin sintering temperature, operating temperature, drag forces in the fluid bed, resin particle size distribution and recycle gas composition. The static voltage can be reduced by a variety of techniques such as by treating the reactor surface to reduce static electric generation, by injection of an antistatic agent to increase particle surface electrical conductivity thus promoting particle discharging; by installation of appropriate devices connected to the reactor walls which are designed to promote electrical discharging by creating areas of high localized field strength, and by neutralization of charges by the injection or creation of ion pairs, ions or charged particles of the opposite polarity from the resin bed.

A particularly preferred technique generally involves treating the reactor vessel prior to polymerization by introducing a chromium containing compound into the reaction vessel in a non-reacting atmosphere.

Referring particularly to the sole FIGURE of the drawing, a conventional fluidized bed reaction system for polymerizing alpha-olefins includes a reactor 10 which consists of a reaction zone 12 and a velocity reduction zone 14.

The reaction zone 12 includes a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed is normally maintained above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum gas flow required to achieve fluidization, C. Y. Wen and Y. H. Yu, "Mechanics of Fluidization", Chemical Engineering Progress Symposium Series, Vol. 62, p. 100–111 (1966).

It is highly desirable that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The appropriate catalyst used in the fluidized bed is preferably stored for service in a reservoir 16 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 18 positioned above the bed. The gas analyzer determines the composition of the gas being recycled the composition of the make-up gas is adjusted accordingly to maintain an essentially steady state gaseous composition within the reaction zone.

To insure complete fluidization, the recycle gas and. where desired, part or all of the make-up gas are returned to the reactor at base 20 below the bed. Gas distribution plate 22 positioned above the point of return ensures proper gas distribution and also supports the resin bed when gas flow is stopped.

The portion of the gas stream which does not react in the bed constitutes the recycle gas which is removed from the polymerization zone, preferably by passing it into velocity reduction zone 14 above the bed where entrained particles are given an opportunity to drop back into the bed.

The recycle gas is then compressed in a compressor 24 and thereafter passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady conditions. The recycle is then returned to the reactor at its base 20 and to the fluidized bed through distribution plate 22. The compressor 24 can also be placed downstream of heat exchanger 26.

Hydrogen may be used as a chain transfer agent for conventional polymerization reactions of the types contemplated herein. In the case where ethylene is used as a monomer the ratio of hydrogen/ethylene employed will vary between about 0 to about 2.0 moles of hydrogen per mole of the monomer in the gas stream.

Any gas inert to the catalyst and reactants can also be present in the gas stream. The cocatalyst is added to the gas recycle stream upstream of its connection with the reactor as from dispenser 28 through line 30.

As is well known, it is essential to operate the fluid bed reactor at a temperature below the sintering temperature of the polymer particles. Thus to insure that sintering will not occur, operating temperatures below sintering temperature are desired. For the production of ehtylene polymers an operating temperature of from about 90° to 100° C. is preferably used to prepare products having a density of about 0.94 to 0.97 while a temperature of about 75° to 95° C. is preferred for products having a density of about 0.91 to 0.94.

Normally the fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The catalyst is injected into the bed at a rate equal to its consumption at a point 32 which is above the distribution plate 22. A gas which is inert to the catalyst such as nitrogen or argon is used to carry the catalyst into the bed. Injecting the catalyst at a point above distribution plate 22 is an important feature. Since the catalysts normally used are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably withdrawn at a point 34 at or close to distribution plate 22. The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone and after delivery, valve 38 is then closed to await the next product recovery operation.

Finally, the fluidized bed reactor is equipped with an adequate venting system to allow venting the bed during the start up and shut down. The reactor does not require the use of stirring means and/or wall scraping means.

The reactor vessel is normally constructed of carbon steel and is designed for the operating conditions stated above.

In order to better illustrate the problems incident to the utilization of the type IV catalysts, reference is again made to the drawing. The titanium based catalyst (type IV) is introduced into the reactor 10 at point 32. Under conventional operations on certain resins, after a brief period of time, i.e. in the order of about 36 to 72 hours, sheets begin to form in reactor 10, at a site in the reactor proximate the wall of the reactor and located about a distance of one-half the reactor diameter up from the base of the fluid bed. The sheets of fused resin begin to appear in segregation zone 40, rapidly plugging the system, causing the reactor to be shut down. More characteristically the sheeting begins. After production equivalent to 6 to 10 times the weight of the bed of resin in reactor 10.

Many possible causes were investigated in attempting to discover and eliminate the sheeting. In the course of the investigation, thermocouples were installed just inside the reactor walls at elevations of ¼ and ½ reactor diameter above the gas distributor plate. Under conventional operations, "skin" thermocouples indicate temperatures equal to the temperature of the fluidized bed. When sheeting occurs, these thermocouples indicate temperature excursions of up to 20° C. above the temperature of the fluidized bed thus providing reliable indication of the occurrence of sheeting. In addition, an electrostatic voltmeter was used to measure voltage on a ½ inch spherical electrode located in the fluid bed 1 inch radially from the reactor wall and ½ reactor diameter above the gas distributor plate. The location was selected because sheet formation was observed to initiate in a band ranging from ¼ to ¾ reactor diameter in elevation above the base of the fluid bed. As is well known for deep fluidized beds, this corresponds to the region of least mixing intensity near the wall, i.e. a null zone where particle motion near the wall changes from generally upward to generally downward. The possible causes investigated included factors affecting mixing in the fluidized bed, reactor operating conditions, catalyst and resin particle size, particle size distribution, and others. A correlation was found between sheeting and buildup of static electric charge on the resin particles proximate the reactor walls. When the static voltage level of resin particles at particular sites proximate the reactor wall in a fluidized bed reactor is low, the reactor runs normally and no sheets are formed. When the static voltage level exceeds a critical level at those sites, uncontrolled sheeting occurs and the reactor must be shut down.

Surprisingly sheeting had not occurred to any significant degree on any resin utilizing the type IV catalysts in reactors which had previously utilized type II catalysts or in reactors that had utilized type I through III catalysts.

It was further discovered that sheeting could be substantially reduced and in some cases entirely eliminated by controlling static voltage in the fluidized bed at a site proximate the reactor walls below the critical level for sheet formation. This critical level for sheet formation is not a fixed value, but is a complex function dependent on variables including resin sintering temperature, operating temperature, drag forces in the fluid bed, resin particle size distribution and recycle gas composition.

The critical voltage level Vc for sheeting of ethylene homopolymers and ethylene-butene copolymers is primarily a function of the resin sintering temperature, the reactor bed temperature and the concentration of hydrogen in the recycle gas. The relationship can be expressed as:

$$Vc = -8000 - 50\,Ts + 90[H_2] + 150\,To$$

where
$Vc$ = voltage below which sheeting will not occur, volts;
$Ts$ = sintering temperature of resin under reactor operating conditions, in °C.;
$To$ = temperature of reactor, in °C. and
$[H_2]$ = mole percent hydrogen in recycle gas The sintering temperature of the resin under reactor operating conditions is the temperature at which a settled bed of resin in contact with a gas having the same composition as the reactor recycle gas used in producing the resin will sinter and form agglomerates when refluidization is attempted after allowing the bed to remain settled for fifteen minutes. The sintering temperature is decreased by decreasing the resin density, by increasing the melt index and by increasing the amount of dissolved monomers.

The constants in the equation were determined from data collected during reactor operation when the reactor just began to exhibit sheeting symptoms through skin thermocouple temperature excursions above the bed temperature. The voltage indicated on the voltage probe described earlier varies with time due to the random nature of a fluidized bed. Thus the critical voltage, Vc, is expressed as a time averaged voltage. Voltage measurements are difficult to interpret because additional static electric charge is generated when a sheet, formed because of a static charge, separates from the reactor wall. In addition, the sheeting phenomena can start as a very local phenomenon and spread further clouding interpretation of voltage readings.

Although the sheeting mechanism is not fully understood, it is believed that static electricity generated in the fluid bed charges resin particles. When the charge on the particles reaches the level where the electrostatic forces trying to hold the charged particle near the reactor wall exceed the drag forces in the bed trying to move the particle away from the wall, a layer of catalyst containing, polymerizing resin particles forms a non-fluidized layer near the reactor wall. Heat removal from this layer is not sufficient to remove the heat of polymerization because the non-fluidized layer near the wall has less contact with the fluidizing gas than do particles in the fluidized portion of the bed. The heat of polymerization increases the temperature of the non-fluidized layer near the reactor wall until the particles melt and fuse. At this point other particles from the fluidized bed will stick to the fused layer and it will grow in size until it comes loose from the reactor wall. The separation of a dielectric from a conductor (the sheet from the reactor wall) is known to generate additional static electricity thus accelerating subsequent sheet formation.

The art teaches various processes whereby static voltage can be reduced or eliminated. These comprise (1) reducing the rate of charge generation, (2) increasing the rate of discharge of electrical charge, and (3) neutralization of electrical charge. Some processes suited for use in a fluidized bed comprise (1) use of an additive to increase the conductivity of the particles thus providing a path for discharging, (2) installation of grounding devices in a fluidized bed to provide additional area for discharging electrostatic charges to ground, (3) ionization of gas or particles by electrical discharge to generate ions to neutralize electrostatic charges on the particles, and (4) the use of radioactive sources to produce radiation that will create ions to neutralize electrostatic charges on the particles. The application of these techniques to a commercial scale, fluidized bed, polymerization reactor may not be feasible or practical. Any additive used must not act as a poison to the polymerization catalyst and must not adversely affect the quality of the product. Thus water, the most widely used additive to reduce static on particles, cannot be used since it is a severe catalyst poison. The installation of grounding devices may actually generate additional electrostatic charge since the friction of resin particles on metal surfaces creates electrostatic charges on the resin particles. The use of ion generators and radiation sources pose severe problems of scale. The ions generated by electric discharge or radiation will be attracted to the reactor walls and other grounded objects and will travel only a limited distance before contacting a grounded object. Thus the ions may not travel far enough from the site of ion generation to discharge the region of the bed where sheeting occurs. Generation of ions within the fluid bed is severely limited by the quenching effect of the cloud of charged particles which form around an ion generator. Thus the number of ion generation sources required may be high adding to the complexity and danger of radiation sources or electrical discharge generators in or near a pressurized, hydrocarbon containing reactor. In the course of the investigation, it was discovered that an effective process for treating the walls of the reactor vessel to reduce static charge generation comprises operation of the reactor for a short, i.e. two week, period utilizing a chromium containing catalyst (type I through III) where the chromium is in the 2 or 3 valence state during at least part of its residence time in the reactor.

Surprisingly, however, it was also discovered that if the walls of the reactor vessel are treated prior to the commencement of polymerization with a chromium containing compound wherein the chromium is present in the reactor at a valence of 2 or 3, then the formation of sheeting during polymerization is substantially reduced and in some cases entirely eliminated.

The chromium containing compounds contemplated for use in the present invention are as explained previously those in which the chromium is present in the reactor at a valence of 2 or 3. Merely as illustrative the following compounds would be suitable for the present invention:

The bis(cyclopentadienyl) chromium (II) compounds having the following formula:

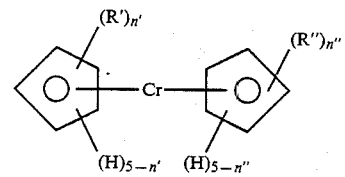

wherein R' and R" may be the same or different $C_1$ to $C_{20'}$ inclusive, hydrocarbon radicals, and n' and n" may be the same or different integers of 0 to 5, inclusive. The R' and R" hydrocarbon radicals can be saturated or unsaturated, and can include aliphatic, alicyclic and aromatic radicals such as methyl, ethyl, propyl, butyl, pentyl, cyclopentyl, cyclohexyl, allyl, phenyl and naphthyl radicals. Other specific compounds which are suitable include chromic acetyl acetonate, chromic nitrate, chromous or chromic acetate, chromous or chromic chloride, chromous or chromic bromide, chromous or chromic fluoride, chromous or chromic sulfate, and polymerization catalysts produced from chromium compounds where the chrome is in the plus 2 or 3 valence state.

Bis(cyclopentadienyl) chromium(chromocene) is the preferred chromium containing compound because of the excellent results achieved.

In general, the chromium containing compound is introduced into the reactor prior to polymerization and can be introduced in any manner such that the surface of the walls of the reactor is contacted with the chromium compound.

In a preferred technique, the chromium compound is dissolved in a suitable solvent and is introduced into the reactor in an inert or non-reactive atmosphere. A resin bed may be employed to help disperse the chromium compound through the reactor.

Suitable solvents for this purpose include but are not limited to benzene, toluene, isopentane, hexane and water. The choice and use of a solvent is dependent on the form of the chrome containing compound and the method of application selected. The function of the solvent is to carry and aid in the dispersion of the chrome containing compound. Suitable inert or non-reactive gases include but are not limited to nitrogen, carbon dioxide, methane, ethane and air.

The amount of chromium compound utilized in the process should be sufficient to effect the desired result, and the amount can be generally determined by one skilled in the art. In general, however, an amount of at least $3.5 \times 10^{-7}$ pound moles chromium per square foot of surface to be treated, preferably $1.0 \times 10^{-6}$ to about $5 \times 10^{-5}$ pound moles per square foot of surface to be treated is preferred.

The polymers to which the present invention is primarily directed and which cause the sheeting problems above referred to in the presence of titanium catalysts are linear homopolymers of ethylene or linear copolymers of a major mol percent ($\geqq 90\%$) of ethylene, and a minor mol percent ($\leqq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1, heptene-1 and octene-1. This description is not intended to exclude the use of this invention with alpha olefin homopolymer and copolymer resins in which ethylene is not a monomer.

The homopolymers and copolymers have a density ranging from about 0.97 to 0.91. The density of the copolymer, at a given melt index level is primarily regulated by the amount of the $C_3$ to $C_8$ comonomer which is copolymerized with the ethylene. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions. In the absence of the comonomer, the ethylene would homopolymerize.

The melt index of a homopolymer or copolymer is a reflection of its molecular weight. Polymers having a relatively high molecular weight, have relatively high viscosities and low melt index.

In a typical mode of utilizing the subject invention to reduce sheeting, a reactor vessel such as shown in the FIGURE and which is susceptible to sheeting problems by the polymerization of the above described materials utilizing type IV catalysts is partially filled with granular polyethylene resin which is purged with a non-reactive gas such as nitrogen and is fluidized by circulating said non-reacting gas through the reactor at a velocity above the minimum fluidizing velocity (Gmf) of the granular polyethylene and preferably at 3 to 5 Gmf. It is to be understood that the use of a fluidized bed of resin is a convenience in said process and is not essential to the process. While the non-reactive gas is being circulated, a chromium-containing compound such as chromocene either neat or preferably dissolved in an inert solvent such as toluene is introduced into the reactor. The concentration of the chromium-containing chemical in the inert solvent is not critical to the process but can be selected by one skilled in the art so as to assure that the chromium-containing chemical is completely dissolved in the solvent. For the preferred case, a solution containing 6 to 8 percent by weight of chromocene in toluene is typical. Approximately $4.0 \times 10^{-5}$ pound moles of the chromium-containing chemical is injected into the reactor for every square foot of surface to be treated. The non-reacting gas is circulated to bring the chromium-containing chemical in contact with the metal surfaces in the system. The treatment is carried out for sufficient time to achieve the desired result, typically several hours to several days. In other modes of treatment, the chemical solution could be applied to the metal surfaces by painting, spraying, or other application methods familiar to one skilled in the art. After treatment the reactor is now ready to begin polymerization in the usual manner.

Having set forth the general nature of the invention, the following examples illustrate some specific embodiments of the invention. It is to be understood, however, that this invention is not limited to the examples, since the invention may be practiced by the use of various modifications.

Examples 1–8 were conducted in a fluidized bed reactor as described in the FIGURE. The catalyst used was a Ziegler type, titanium based catalyst supported on porous silica produced as described earlier as type IV. The cocatalyst used was triethyl aluminum. The products made in the examples were copolymers of ethylene and 1-butene. Hydrogen was used as a chain transfer agent to control the melt index of the polymer. The reactors of Example 1 and 2, had not been used to produce polyethylene with any catalyst except those of the type described earlier as type IV.

EXAMPLE 1

A fluidized bed reactor was started up at operating conditions designed to produce a film grade low density ethylene copolymer product having a density of 0.918, a melt index of 1.0, and a sticking temperature of 104° C. The reaction was started by feeding catalyst to a reactor precharged with a bed of granular resin similar to the product to be made. The catalyst was a mixture of 5.5 parts titanium tetrachloride, 8.5 parts magnesium chloride and 14 parts tetrahydrofuran deposited on 100 parts Davison grade 952 silica which had been dehydrated at 800° C. and treated with four parts triethylaluminum prior to deposition and was activated with thirty five parts tri-n-hexyl aluminum subsequent to deposition. Prior to starting catalyst feed, the reactor and resin bed were brought up to the operating temperature of 85° C., were purged of impurities by circulating nitrogen through the resin bed. Ethylene, butene and hydrogen concentrations were established at 53, 24, and 11% respectively. Cocatalyst was fed at a rate of 0.3 parts triethylamunimum per part of catalyst.

Reactor start-up was normal. After producing product for 29 hours and equivalent to 6½ times the weight of the fluidized bed, temperature excursions of 1° to 2° C. above bed temperature were observed using thermocouples located just inside the reactor wall at an elevation of ½ reactor diameter above the gas distributor plate. Prior experience had shown that such temperature excursions are a positive indication that sheets of resin are being formed in the fluidized bed. Concurrently, bed voltage (measured using an electrostatic voltmeter connected to a ½ inch diameter spherical electrode located one inch from the reactor wall at an elevation of ½ reactor diameter above the gas distributor plate) increased from a reading of approximately +1500 to +2000 volts to a reading of over +5000 volts and then dropped back to +2000 volts over a 3 minute period. Temperature and voltage excursions continued for approximately 12 hours and increased in frequency and magnitude. During this period, sheets of fused polyethylene resin began to show up in the resin product. Evidence of sheeting became more severe, i.e. temperature excursions increased to as high as 20° C. above bed temperature and stayed high for extended periods of time and voltage excursions also became more frequent. The reactor was shut down because of the extent of sheeting.

EXAMPLE 2

The fluidized bed reactor used in Example 1 was started up and operated to produce a linear low density ethylene copolymer suitable for extrusion or rotational molding and having a density of 0.934, a melt index of 5 and a sticking temperature of 118° C. The reaction was started by feeding catalyst similar to the catalyst in Example 1 except activated with 28 parts tri-n-hexylaluminum, to the reactor precharged with a bed of granular resin similar to the product to be made. Prior to starting catalyst feed the reactor and resin bed were brought up to the operating temperature of 85° C., and were purged of impurities with nitrogen. The concentrations of ethylene (52%), butene (14%), hydrogen (21%) were introduced into the reactor. Cocatalyst triethylaluminum was fed at 0.3 parts per part of catalyst. The reactor was operated continuously for 48 hours and during that period produced resin equivalent to 9 times the amount of resin contained in the bed. After this 48 hour period of smooth operation, sheets of fused resin began to come out of the reactor with the normal, granular product. At this time voltages measured ½ reactor diameter above the distributor plate averaged +2000 volts and ranged from 0 to 10,000 volts, while the skin thermocouples at the same elevation indicated excursions of >15° C. above the bed temperature. Two hours after the first sheets were noted in the product from the reactor, it was necessary to stop feeding catalyst and cocatalyst to the reactor to reduce the resin production rate because sheets were plugging the resin discharge system. One hour later, catalyst and cocatalyst feeds were restarted. The production of sheets continued and after two hours catalyst and cocatalyst feed were again stopped and the reaction was terminated by injecting carbon monoxide. The voltage at this time was >+12,000 volts and the thermocouple excursions continued until the poison was injected. In total, the reactor was operated for 53 hours and produced 10½ bed volumes of resin before the reaction was stopped due to sheeting.

EXAMPLE 3

The reactor of Examples 1 and 2 was treated as follows: The treatment comprised charging a bed of granular resin and purging and drying the bed with high purity nitrogen to a vapor water concentration of less than 10 ppmv. The bed was thereafter fluidized by circulating nitrogen. Chromocene [bis(cyclopentadienyl)chromium] in toluene solution was injected into the bed. $4.3 \times 10^{-5}$ pound moles of chromocene were added for each square foot of steel surface in the system. The bed was heated to 92° C. and nitrogen was circulated for 24 hours. After the treatment was completed, the bed was cooled to 40° C. and 20 standard cubic feet of air was injected for each pound of chromocene in the system to oxidize the chromocene before removing the resin from the reactor.

The treated reactor was then charged with a bed of resin similar to that described in Example 1. The bed was brought up to 85° C., purged, and the ethylene, butene, hydrogen, and cocatalyst concentrations were established at the same concentrations of Example 1, prior to injection of the same catalyst as Example 1. The reactor started up at operating conditions designed to produce a film grade low density polyethylene copolymer product having a density of 0.918, a melt index of 1.0, and a sintering temperature of 104° C. as in Example 1. The reactor ran for 90 hours, producing approximately 3 times as much product as in Example 1, after which it was shut down for routine inspection and maintenance. No temperature excursions were noted and no resin sheets were formed. At the end of the run, the voltage measured near the wall at an elevation ½ reactor diameter above the gas distributor plate had stabilized at about −100 volts and no major voltage excursions were observed at any time during the run.

EXAMPLE 4

The reactor utilized for Example 3 was subsequently charged with a bed of resin similar to that described in Example 2. The bed was heated to 90° C., purged and the ethylene (51%), butene (13%) and hydrogen (18%) and cocatalyst (0.3 parts per part of catalyst) were established prior to injection of catalyst. The reaction started smoothly and produced linear low-density polyethylene resin with a density of 0.934, a melt index of 5, and a sintering temperature of 118° C.

The reactor operated continuously for 80 hours and produced resin equivalent to twenty times the weight of the resin bed before it was transitioned to another product grade. The thermocouples located near the surface of the reactor wall ¼ and ½ the reactor diameter above the distributor showed a few brief (1 minute) temperature excursions. Voltage measured near the wall at an elevation of ½ reactor diameter above the gas distributor plate averaged +1200 volts and showed voltage oscillation form 0 to as high as +8,000 volts. Some pieces of resin typically ½ by 1 by 1 inch with the appearance of sintered fine particles appeared in the product discharge tank and constituted ≦0.01 percent of the resin produced. These did not reduce the production rate of the reaction system nor did they harm the quality of the resin produced.

As will be seen from the above, the following data corresponds to the Vc formula expressed previously:

$$\begin{aligned}
Vc &= -8000 - 50 \text{ (sintering temp.)} + 90 \\
& \quad \text{(hydrogen concentration)} + 150 \text{ (operating temperature)} \\
&= -8000 - 50(118° \text{ C.}) + 90(18\%) + 150(90° \text{ C.}) \\
&= +1220 \text{ volts}
\end{aligned}$$

EXAMPLES 5-8

Four runs were made utilizing the reactor and procedure of Examples 1 and 2 to determine critical voltage. Various ethylene, butene-1 copolymers and/or ethylene homopolymers were used for each run as shown in Table I.

The critical voltages, Vc, were the voltage level measured near the reactor wall (one half the reactor diameter above the distributor plate) when the reactor showed symptons of initiation of sheeting (normally small skin thermocouple excursions above bed temperature). The sticking temperatures were estimated from tests in which a reaction was terminated, the bed allowed to settle for 15 minutes and then refluidized.

The results are indicated in Table I below.

TABLE I

| Example | H₂ Mole % | Ethylene Concentration Mole % | Butene Concentration Mole % | Catalyst of Example | Resin Melt Index | Resin Density | Sintering Temp. °C. | Operating Temp. °C. | Vc Volts |
|---|---|---|---|---|---|---|---|---|---|
| 5 | 11 | 53 | 24 | 1 | 1.0 | .918 | 104 | 85 | +200 to +1000 |
| 6 | 14 | 51 | 23 | 1 | 2.0 | .918 | 102 | 85 | +200 to +1000 |
| 7 | 30 | 50 | 7 | 2 | 12. | .926 | 108 | 85 | +2100 |
| 8 | 21 | 65 | 0 | 2 | 7.5 | .965 | 125+ | 110 | +4100 |

As will be noted from Table I, for Example 5, sheeting begins to occur over +1000 volts. Moreover, from the above Table I it will be seen that the critical voltage is dependent on the resin sintering temperature, the operating temperature and the hydrogen concentration in the recycle gas.

What is claimed is:

1. An improvement in the method for polymerization of alpha-olefins in a fluidized bed reactor utilizing titanium based catalysts prone to cause sheeting during said polymerization, the improvement comprising maintaining the static electric charge in said reactor at the site of possible sheet formation below static voltage levels which would otherwise cause sheet formation, by introducing a chromium containing compound into said reactor in such manner as to contact the surfaces of said reactor, said chromium in said chromium containing compound being present in a valence state of 2 or 3.

2. A process for reducing sheeting during production of polyolefins by polymerization of alpha-olefins in a fluidized bed reactor utilizing titanium polymerization catalysts which comprises contacting the surfaces of the reaction vessel in which said polymerization takes place with a chromium containing compound, said chromium being present in said compound at a valence state of 2 or 3, said chromium containing compound being used in an amount sufficient to reduce the amount of sheeting formed during said polymerization.

3. A process according to claim 2 in which said chromium containing compound is dissolved in an inert solvent prior to introduction to said reactor.

4. A process according to claim 3 wherein said inert solvent is toluene.

5. A process according to claim 3 wherein said inert solvent is introduced into said reaction vessel in an inert atmosphere.

6. A process according to claim 2 wherein said chromium containing compound is bis(cyclopentadienyl) chromium.

7. A process according to claim 2 wherein said polyolefins are linear homopolymers of ethylene or linear copolymers of a major mol percent ($\geq 90\%$) of ethylene, and a minor mol percent ($\leq 10\%$) of one or more $C_3$ to $C_8$ alpha olefins.

8. A process according to claim 2 wherein said polyolefins are homopolymers or copolymers of propylene, butene-1, pentene-1, hexene-1, 4-methylpentene-1, heptene-1 or octene-1.

9. A process for reducing sheeting during polymerization of alpha-olefins in a fluidized bed reactor to produce linear homopolymers of ethylene or linear copolymers of a major mol percent ($\geq 90\%$) of ethylene, and a minor mol percent ($\leq 10\%$) of one or more $C_3$ to $C_8$ alpha olefins, utilizing titanium based polymerization catalysts which comprises introducing said reaction vessel prior to polymerization, a chromium containing compound dissolved in an inert solvent, said chromium being present in said compound at a valence state of 2 or 3, said chromium containing compound being introduced into said reactor in an inert atmosphere.

10. A process according to claim 9 in which said titanium catalyst comprises at least one titanium compound, at least one magnesium compound, at least an electron donor compound at least one activator compound and at least one inert carrier material.

11. A process according to claim 10 in which said titanium compound has the structure:

$$Ti(OR)_a X_b$$

wherein R is a $C_1$ to $C_{14}$ aliphatic or aromatic hydrocarbon radical, or COR' where R' is a $C_1$ to $C_{14}$ aliphatic or aromatic hydrocarbon radical; X is Cl, Br, or I; a is 0 or 1; b is 2 to 4 inclusive; and a+b=3 or 4.

12. A process according to claim 11 wherein said chromium containing compound has the following formula:

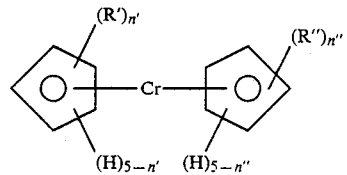

wherein R' and R" may be the same or different $C_1$ to $C_{20}$, inclusive, hydrocarbon radicals, and n' and n" may be the same or different integers of 0 to 5, inclusive.

13. A process according to claim 12 wherein said chromium containing compound is bis(cyclopentadienyl) chromium.

14. A process for reducing sheeting during polymerization of alpha-olefins to produce linear homopolymers of ethylene or linear copolymers of a major mol percent ($\geq 90\%$) of ethylene, and a minor mol percent ($\leq 10\%$) of one or more $C_3$ to $C_8$ alpha olefins, utilizing a titanium based catalyst, said catalyst comprising at least one titanium compound, at least one magnesium compound, at least one electron donor compound, at least one activator compound, and at least one inert carrier material for the polymerization which comprises introducing into said reaction vessel prior to polymerization bis(cyclopentadienyl) chromium in an inert solvent, said solvent being introduced into said reactor in an inert atmosphere.

15. A process according to claim 14 wherein said titanium compound has the structure $$Ti(OR)_a X_b$$

wherein R is a $C_1$ to $C_{14}$ aliphatic or aromatic hydrocarbon radical, or COR' where R' is a $C_1$ to $C_{14}$ aliphatic or aromatic hydrocarbon radical; X is Cl, Br, or I; a is 0 or 1; b is 2 to 4 inclusive; and a+b=3 or 4.

* * * * *

UNITED STATES PATENT AND TRADEMARK OFFICE
CERTIFICATE OF CORRECTION

PATENT NO. : 4,532,311
DATED : July 30, 1985
INVENTOR(S) : B.D. Fulks; S.P. Sawin; C.D. Aikman; J.M. Jenkins It is certified that error appears in the above-identified patent and that said Letters Patent is hereby corrected as shown below:

Column 1 under [63] change "Serial No. 244,990" to -- Serial No. 247,990--

Column 2, line 17 delete "heretofore described"

Column 3, line 4 change "carrie" to -- carrier --.
line 52 change "iclude" to -- include --.

Column 6, line 8 after "recycled" insert -- and --.
line 58 change "ehtylene" to -- ethylene --.

Column 7, line 56 delete the period and change "After" to --after--.

Column 14, line 39 change "½" to -- ¼ --.

Column 16, line 47 change "( $\leq$ 90%)" to -- ( $\geq$ 90%) --.

Signed and Sealed this

First Day of April 1986

[SEAL]

Attest:

DONALD J. QUIGG

Attesting Officer

Commissioner of Patents and Trademarks